(12) United States Patent
Satou

(10) Patent No.: US 10,107,704 B2
(45) Date of Patent: Oct. 23, 2018

(54) TORQUE ESTIMATING DEVICE OF GAS COMPRESSOR

(71) Applicant: CALSONIC KANSEI CORPORATION, Saitama (JP)

(72) Inventor: Keita Satou, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 0 days.

(21) Appl. No.: 15/534,777

(22) PCT Filed: Nov. 20, 2015

(86) PCT No.: PCT/JP2015/082797
§ 371 (c)(1),
(2) Date: Jun. 9, 2017

(87) PCT Pub. No.: WO2016/093045
PCT Pub. Date: Jun. 16, 2016

(65) Prior Publication Data
US 2017/0343445 A1  Nov. 30, 2017

(30) Foreign Application Priority Data

Dec. 10, 2014 (JP) .................................. 2014-250158

(51) Int. Cl.
| | |
|---|---|
| *G01L 25/00* | (2006.01) |
| *F04B 35/00* | (2006.01) |
| *G01L 3/00* | (2006.01) |
| *G01L 5/26* | (2006.01) |
| *B60H 1/32* | (2006.01) |
| *F04B 35/04* | (2006.01) |
| *F04B 51/00* | (2006.01) |

(52) U.S. Cl.
CPC .......... *G01L 25/003* (2013.01); *B60H 1/3208* (2013.01); *F04B 35/00* (2013.01);
(Continued)

(58) Field of Classification Search
CPC . G01L 25/003; G01L 3/00; G01L 5/26; F04B 35/00; F04B 35/04; F04B 51/00;
(Continued)

(56) References Cited

U.S. PATENT DOCUMENTS

| | | | | |
|---|---|---|---|---|
| 4,976,589 A | * | 12/1990 | Ide ....................... | B60H 1/3208 123/339.17 |
| 2003/0079718 A1 | * | 5/2003 | Kadoi .................. | B60H 1/3205 123/339.17 |

(Continued)

FOREIGN PATENT DOCUMENTS

| | | |
|---|---|---|
| CN | 101725646 | 6/2010 |
| CN | 104167972 | 11/2014 |

(Continued)

OTHER PUBLICATIONS

International Search Report dated Feb. 16, 2016 in International (PCT) Application No. PCT/JP2015/082797.

*Primary Examiner* — David Bolduc
(74) *Attorney, Agent, or Firm* — Wenderoth, Lind & Ponack, L.L.P.

(57) ABSTRACT

A torque estimating device of a gas compressor includes a reference torque characteristic storage unit that stores a reference torque characteristic of the gas compressor as a torque characteristic of the gas compressor in a specific operation state, a torque setting unit that sets a torque corresponding to an input speed of rotation of the gas compressor and pressure of a refrigerant discharged from the gas compressor, on the basis of the reference torque characteristic stored in the reference torque characteristic storage unit, and a torque correcting unit that sets a torque at startup of the gas compressor among the torques set by the torque setting unit, by correcting the torque set by the torque setting unit, in accordance with the speed of rotation and an elapsed time from startup.

10 Claims, 5 Drawing Sheets

(52) U.S. Cl.
CPC .............. *F04B 35/04* (2013.01); *F04B 51/00* (2013.01); *G01L 3/00* (2013.01); *G01L 5/26* (2013.01); *B60H 2001/325* (2013.01); *B60H 2001/3238* (2013.01); *B60H 2001/3273* (2013.01); *F04B 2203/0207* (2013.01)

(58) Field of Classification Search
CPC .......... F04B 2203/0207; B60H 1/3208; B60H 2001/3238; B60H 2001/325; B60H 2001/3273
See application file for complete search history.

(56) References Cited

U.S. PATENT DOCUMENTS

| | | | | |
|---|---|---|---|---|
| 2004/0211204 | A1* | 10/2004 | Matsubara | B60H 1/3216 62/228.1 |
| 2006/0080976 | A1* | 4/2006 | Markowitz | B60H 1/3208 62/129 |
| 2010/0106362 | A1 | 4/2010 | Major et al. | |
| 2010/0236265 | A1* | 9/2010 | Higuchi | B60H 1/3216 62/228.4 |
| 2015/0291003 | A1* | 10/2015 | Watanabe | B60H 1/3205 417/34 |

FOREIGN PATENT DOCUMENTS

| | | |
|---|---|---|
| DE | 10 2009 050 131 | 5/2010 |
| EP | 1 437 245 | 7/2004 |
| EP | 2 206 617 | 7/2010 |
| JP | 2003-120545 | 4/2003 |
| JP | 2004-211663 | 7/2004 |
| JP | 3921430 | 2/2007 |
| JP | 2009-107419 | 5/2009 |
| WO | 2009/057480 | 5/2009 |

* cited by examiner

TORQUE ESTIMATING DEVICE OF GAS COMPRESSOR

This application claims priority from Japanese Patent Application No. 2014-250158 filed with the Japan Patent Office on Dec. 10, 2014, the entire disclosure of which is fully incorporated by reference in this description.

TECHNICAL FIELD

The present invention relates to a torque estimating device of a gas compressor.

BACKGROUND ART

For an air conditioning system (hereinafter referred to as AC system), a gas compressor is used. A gas compressor operates upon receiving external supply of power. Therefore, a gas compressor becomes a load with respect to an external power source. In the case where an AC system is mounted on a vehicle, for example, a power source is often an engine of the vehicle. In the engine, when a gas compressor is operating, it is necessary to optimally perform control, for example, fuel injection with an engine control device (hereinafter referred to as engine control unit (ECU)) in accordance with the load of the gas compressor. Thus, estimation of a torque upon operation of the gas compressor is performed (for example, see JP 3921430 B).

SUMMARY

Technical Problem

In a torque estimating device of a compressor described in Patent Literature 1, estimation regarding the torque upon normal operation after a predetermined time has elapsed from startup is made based on the engine rotation speed and the pressure of a refrigerant (See description in paragraph 0024 and FIG. 4 in Patent Literature 1). Regarding the torque at startup, a torque in accordance with the pressure of the refrigerant immediately before startup is obtained and stored in advance as a torque characteristic, the pressure of the refrigerant immediately before startup is actually detected, and a torque corresponding to the detected pressure is estimated on the basis of the stored torque characteristic.

When the speed of rotation of a power source such as an engine immediately before startup is fast, the torque at startup tends to be large. However, since the torque estimating device of a compressor described in Patent Literature 1 estimates the torque at startup on the basis of only the pressure of the refrigerant immediately before startup, the speed of rotation of the power source and the elapsed time from startup is not taken into consideration. Therefore, an error for the estimated torque at startup and the actual torque at startup is large when the speed of rotation is fast. The error is particularly large in a rotary gas compressor having a characteristic that the compression speed is fast.

In view of the above circumference, an object of the present invention is to provide a torque estimating device of a gas compressor that can improve the accuracy of estimating a torque at startup.

Solution to Problem

In the present invention, a torque estimating device of a gas compressor includes a reference torque characteristic storage unit, a torque setting unit, and a torque correcting unit. The reference torque characteristic storage unit stores a reference torque characteristic of a gas compressor as a torque characteristic of the gas compressor in a specific operation state. The torque setting unit sets a torque corresponding to an input speed of rotation of the gas compressor and pressure of a refrigerant discharged from the gas compressor, on the basis of the reference torque characteristic stored in the reference torque characteristic storage unit. The torque correcting unit sets a torque at startup of the gas compressor among the torques set by the torque setting unit, by correcting the torque set by the torque setting unit, in accordance with the speed of rotation and/or an elapsed time from startup (correction in accordance with at least one of the speed of rotation and the elapsed time from startup).

DESCRIPTION OF EMBODIMENT

An embodiment according to a torque estimating device of a gas compressor of the present invention will be described below with reference to the drawings.

(Configuration of Torque Estimating Device)

Figure 1:
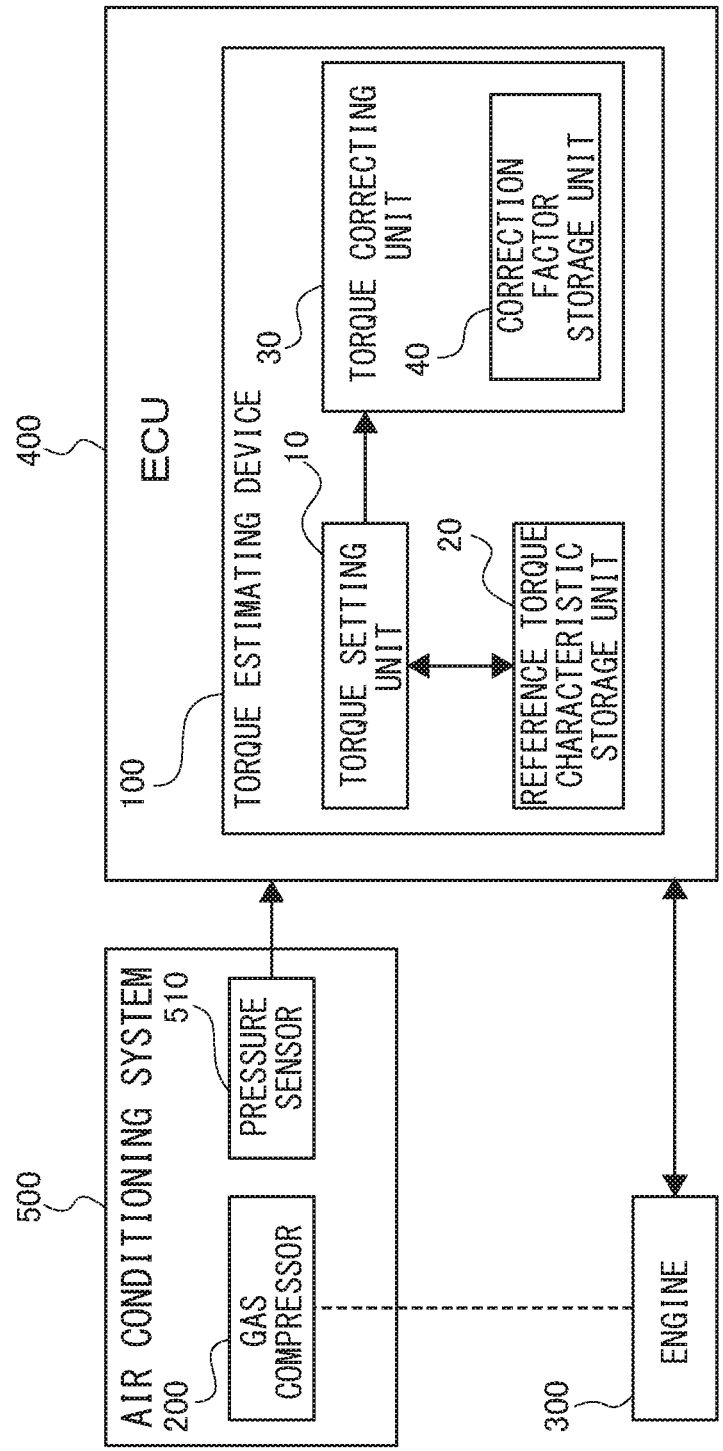
FIG. 1 is a block diagram showing the configuration of a torque estimating device of a gas compressor in one embodiment of the present invention.

FIG. 1 is a block diagram showing the configuration of a torque estimating device 100 of a gas compressor 200 in one embodiment of the present invention. The gas compressor 200 of which a torque is estimated by the torque estimating device 100 of this embodiment is, for example, a rotary vane type gas compressor. For example, in the gas compressor 200, five vanes are embedded at equal angular intervals in a rotor that rotates together with a rotation shaft, and suction, compression, and discharge of a refrigerant are performed ten times during one rotation of the rotation shaft (one rotation of the rotor).

The torque estimating device 100 shown in FIG. 1 is a device that operates with an engine 300 mounted on a vehicle as a power source and estimates a torque during operation of the gas compressor 200 in an air conditioning system 500 equipped on the vehicle. The torque estimating device 100 is used for the purpose of setting (estimating) a load (torque) that acts on the engine 300 at startup of the gas compressor 200 and, in accordance with the torque, controlling, for example, fuel injection by an engine control device (ECU 400) controlling the operation of the engine 300 to be performed optimally. The torque estimating device 100 is provided inside the ECU 400. The torque estimating device 100 includes a reference torque characteristic storage unit 20, a torque setting unit 10, and a torque correcting unit 30.

The reference torque characteristic storage unit 20 stores a reference torque characteristic of the gas compressor 200 in an operation state. The reference torque characteristic is the characteristic of a torque obtained experimentally in advance, with the speed of rotation (number of rotations) of the gas compressor 200 and the pressure of the refrigerant at the exit of a capacitor in the air conditioning system 500 as parameters. The obtained reference torque characteristic (correspondence relationship of the speed of rotation and the pressure of the refrigerant to the torque) is represented as a map, for example, and stored in the reference torque characteristic storage unit 20. As the reference torque characteristic in the torque estimating device 100, the pressure of the refrigerant at the exit of the gas compressor 200 may be applied, instead of the pressure of the refrigerant at the exit of the capacitor. In that case, the pressure of the refrigerant input to the torque setting unit 10 is also the pressure at the exit of the gas compressor 200.

On the basis of the reference torque characteristic stored in the reference torque characteristic storage unit 20, the torque setting unit 10 sets a torque corresponding to the speed of rotation of the engine 300 detected by the ECU 400 and the pressure of the refrigerant input from a pressure sensor 510 provided at the exit of the capacitor of the air conditioning system 500. The gas compressor 200 is driven by the engine 300 via a pulley, and the speed of rotation of the gas compressor 200 corresponds to the speed of rotation of the engine 300. Therefore, the value of the speed of rotation of the engine 300 detected by the ECU 400 multiplied by the pulley ratio is input to the torque estimating device 100 as the speed of rotation of the gas compressor 200.

When the gas compressor 200 actually operates, the ECU 400 needs to control, for example, the fuel injection to appropriately follow the speed of rotation of the engine 300, in accordance with the torque estimated by the torque estimating device 100. Thus, particularly at the moment of startup of the gas compressor 200, the ECU 400 needs to instantly follow the torque of the gas compressor 200 at that time. Therefore, the value of the speed of rotation of the engine 300 immediately before the actual startup of the gas compressor 200 multiplied by the pulley ratio is applied, as the speed of rotation at startup of the gas compressor 200. Accordingly, the following performance to control the fuel injection and the like by the ECU 400 is improved.

Figure 2:
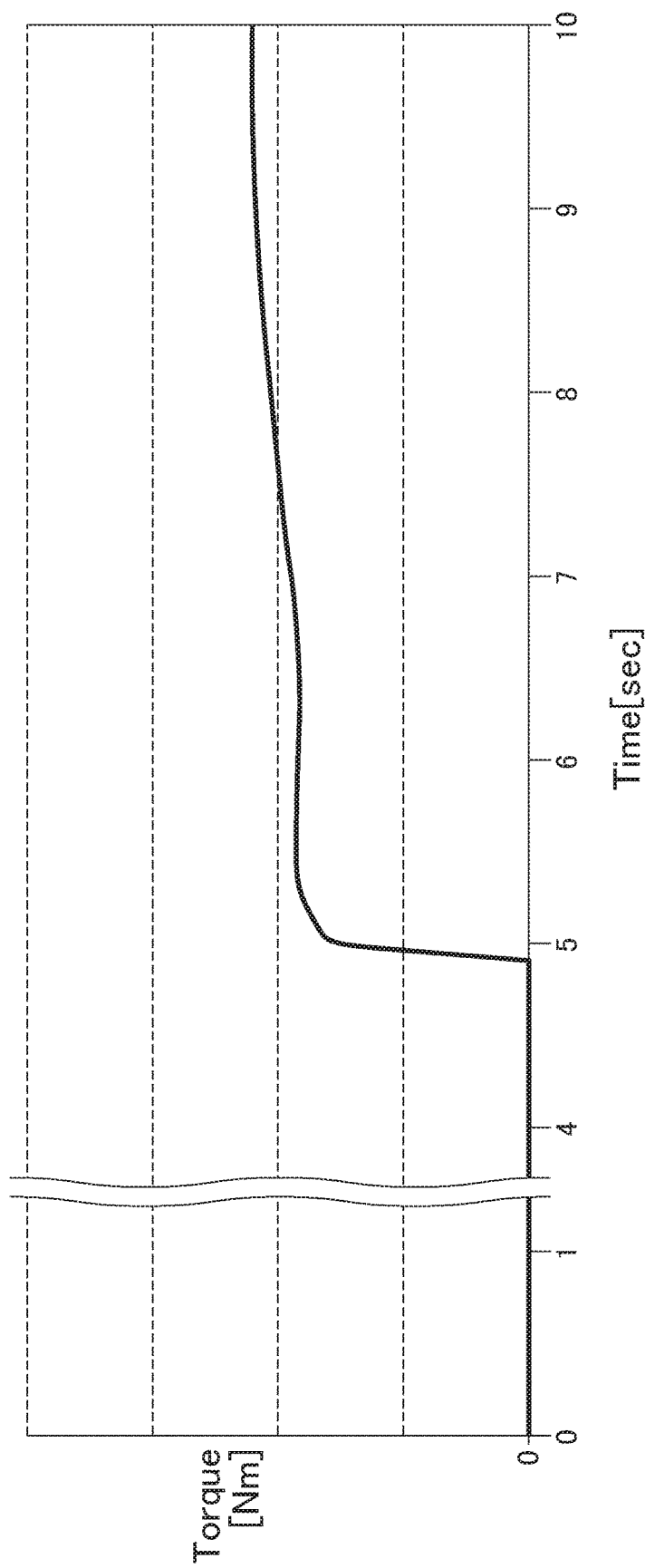
FIG. 2 is a graph showing one example of a torque set by a torque setting unit.

The torque corresponding to the input speed of rotation of the gas compressor 200 and pressure of the refrigerant is set by, for example, an interpolation process, on the basis of the correspondence relationship (reference torque characteristic) of the speed of rotation, the pressure of the refrigerant, and the reference torque stored as a map. FIG. 2 is a graph showing one example of the torque set by the torque setting unit 10. In FIG. 2, the gas compressor 200 is started up at the point of 4.9 seconds in time as an exemplification. Therefore, the torque sharply increases in the figure in accordance with the speed of rotation of the gas compressor 200 and the pressure of the refrigerant from the point of 4.9 seconds in time.

The torque correcting unit 30 sets (estimates) the torque at startup of the gas compressor 200 (torque in a range of, for example, approximately 2 seconds in the elapsed time from startup) among torques set by the torque setting unit 10 (for example, see FIG. 2), by correcting the torque set by the torque setting unit 10, in accordance with the input speed of rotation and elapsed time from startup of the gas compressor 200. The torque correcting unit 30 includes a correction factor storage unit 40. The correction factor storage unit 40 stores a correction factor. The correction factor is used for correcting the torque set by the torque setting unit 10 and is set in accordance with the input speed of rotation of the gas compressor 200 and elapsed time from startup of the gas compressor 200. The torque correcting unit 30 multiplies the torque set by the torque setting unit 10 by the correction factor stored in the correction factor storage unit 40 to set (estimate) the torque at startup. Herein, the correction factor is obtained in advance experimentally.

The speed of rotation of the gas compressor 200 input to the torque correcting unit 30 is the value of the speed of rotation of the engine 300 that is detected by the ECU 400 multiplied by the pulley ratio. The torque correction unit 30 corrects the torque set by the torque setting unit 10 in accordance with the speed of rotation of the gas compressor 200 and the elapsed time from startup of the gas compressor 200, such that the degree of the correction is set to be large as the speed of rotation of the gas compressor 200 is high (the number of rotations is large) and is set to be small as the elapsed time from startup of the gas compressor 200 is long.

Figure 3:
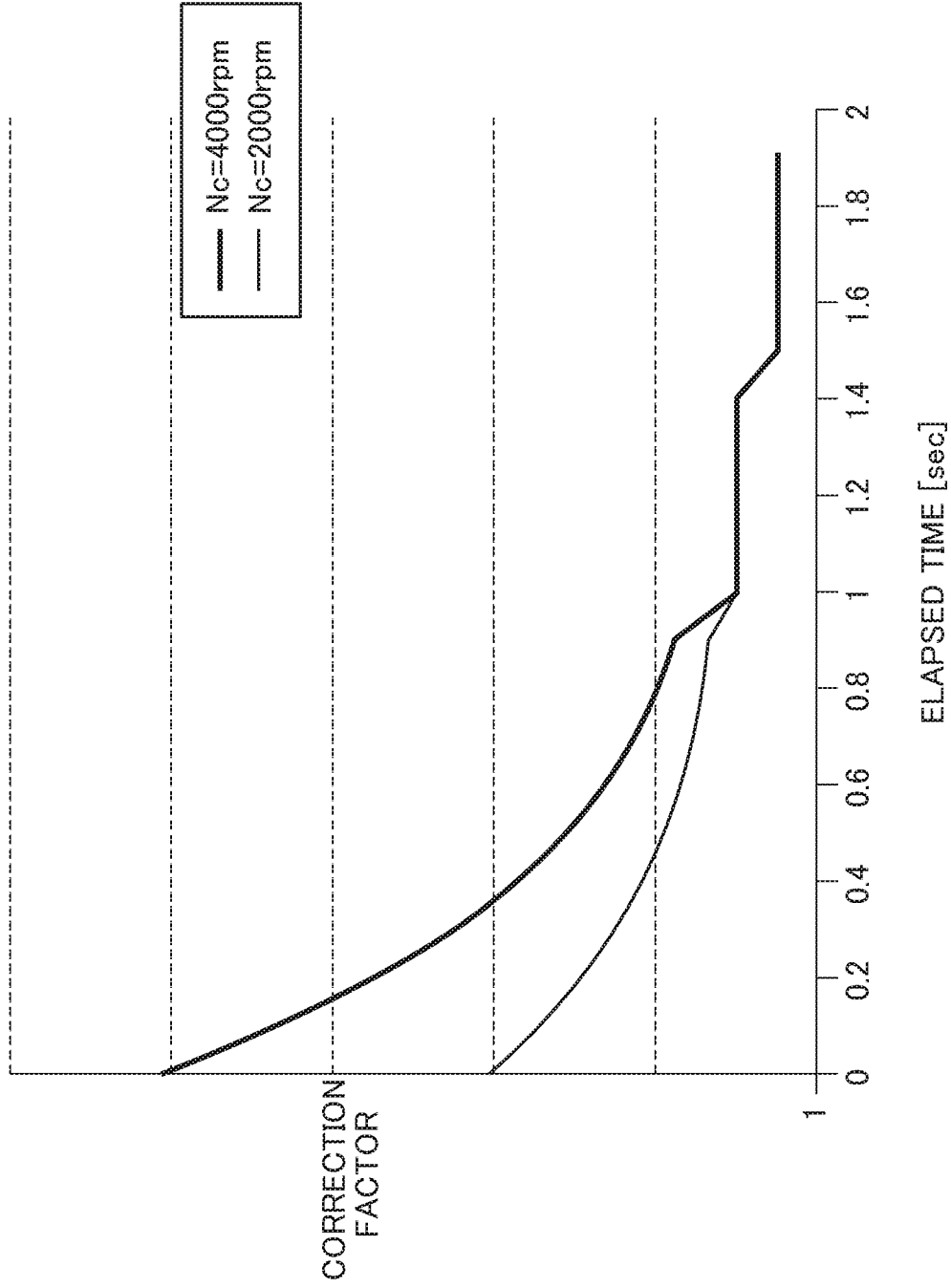
FIG. 3 is a graph showing a correction factor stored in a correction factor storage unit.

FIG. 3 is a graph showing the correction factor stored in the correction factor storage unit 40. The bold solid line in the graph of the correction factor in FIG. 3 shows the correction factor set in accordance with the elapsed time from startup of the gas compressor 200, corresponding to a speed of rotation of 4000 (rpm) of the gas compressor 200. The thin solid line in the graph of the correction factor in FIG. 3 shows the correction factor set in accordance with the elapsed time from startup of the gas compressor 200, corresponding to a speed of rotation of 2000 (rpm) of the gas compressor 200. The thin solid line and the bold solid line in the graph overlap in a range in which the elapsed time is 1.0 second and thereafter.

The torque correcting unit 30 performs the correction in accordance with the elapsed time such that the degree of correction is set constant (the correction factor is constant) when the elapsed time has exceeded a length set in advance. Specifically, the correction factor is set to a constant value of 1.1 in a range in which the elapsed time is 1.0 second to 1.4 seconds, and the correction factor is set to a constant value of 1.05 in a range in which the elapsed time is 1.5 seconds to 1.9 seconds. It should be noted that, the torque correcting unit 30 does not perform the correction when the elapsed time has exceeded 1.9 seconds and thereafter. Therefore, a correction factor for an elapsed time of 1.9 seconds and thereafter is not set. However, that the torque correcting unit 30 may be configured to perform the correction for an elapsed time of 1.9 seconds and thereafter. In that case, it suffices to set the correction factor to a constant value of 1.0 for an elapsed time of 1.9 seconds and thereafter.

Operation of Torque Estimating Device

Next, the operation of the torque estimating device 100 of this embodiment will be described. The gas compressor 200 is started up by, for example, an electromagnetic clutch being connected to start operation in synchronization with the engine 300. The time of startup of the gas compressor 200 is, for example, a point of 4.9 seconds in time shown in FIG. 2. As the speed of rotation of the gas compressor 200 from startup of the gas compressor 200, the value of the speed of rotation of the engine 300 immediately before startup of the gas compressor 200 multiplied by the pulley ratio is input to the torque estimating device 100 from the ECU 400. The pressure of the refrigerant from immediately before startup of the gas compressor 200 (as the pressure of the refrigerant discharged from the gas compressor 200) is input to the torque estimating device 100 from the pressure sensor 510.

The torque setting unit 10 sets the torque corresponding to the input speed of rotation of the gas compressor 200 and pressure of the refrigerant, on the basis of the reference torque characteristic stored in the reference torque characteristic storage unit 20. The torque set by the torque setting unit 10 for each input of the speed of rotation and the pressure of the refrigerant shows a characteristic as shown in FIG. 2, for example. That is, immediately after startup of the gas compressor 200 (in a range of 4.9 seconds in time to 5.0 seconds in time in FIG. 2), the torque set in accordance with the speed of rotation of the gas compressor 200 and the pressure of the refrigerant input for each time sharply increases. After the sharp increase of the torque (in a range of 5.0 seconds to 10 seconds in time in FIG. 2), the torque set in accordance with the speed of rotation of the gas compressor 200 and the pressure of the refrigerant input for each time moderately increases. Then, the torque set in accordance with the speed of rotation of the gas compressor 200 and the pressure of the refrigerant input for each corresponding time approaches an approximately constant value.

The torque correcting unit 30 sets (estimates) the torque for 2 seconds from startup of the gas compressor 200 among torques (see FIG. 2) set by the torque setting unit 10 every time in accordance with the detected speed of rotation of the gas compressor 200 and pressure of the refrigerant, by correcting the torque set by the torque setting unit 10. Specifically, calculation is done by multiplying the torque set by the torque setting unit 10 by the correction factor in accordance with the speed of rotation input to the torque correcting unit 30 and the input elapsed time from startup of the gas compressor 200.

The correction factor in accordance with the speed of rotation input to the torque correcting unit 30 and the input elapsed time from startup of the gas compressor 200 is obtained by performing an interpolation process of the correction factor, which is set in accordance with the elapsed time from startup and corresponds to two types of the speed of rotation (4000 (rpm) and 2000 (rpm)) stored in the correction factor storage unit 40, according to the input speed of rotation. Then, the torque set by the torque setting unit 10 is multiplied by the obtained correction factor, according to the elapsed time from startup.

Figure 4:
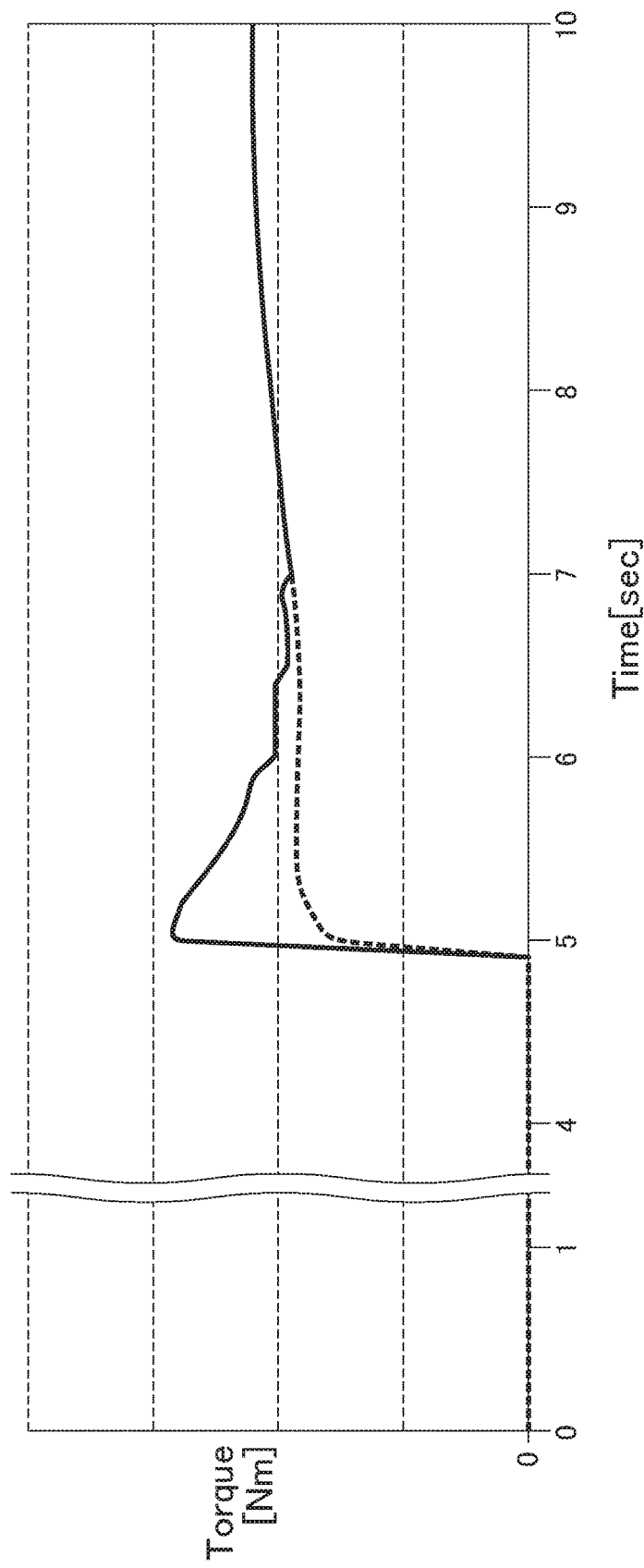
FIG. 4 is a graph showing a torque after correction by a torque correcting unit.

FIG. 4 is a graph showing the torque after correction by the torque correcting unit 30. The torque correcting unit 30 corrects the torque (shown by the broken line in FIG. 4, identical to the solid line in FIG. 2) set by the torque setting unit 10 and sets (estimates) the torque (shown by the solid line in FIG. 4) after the correction. The torque estimating device 100 sets (estimates) the torque at startup by the correction in a range from startup of the gas compressor 200 to 2 seconds, but sets (estimates) the torque set by the torque setting unit 10 directly as a steady torque without correction for the torque at 2 seconds from startup and thereafter. In FIG. 4, the solid line (torque after correction) in the graph overlaps the broken line (torque before correction) from approximately before 7 seconds in time, which is 2 seconds from startup and thereafter.

With the torque estimating device 100 configured in the above manner, the torque at startup of the gas compressor 200 having a characteristic of becoming larger than the steady torque as the speed of rotation at startup becomes higher can be set (estimated) with accuracy by correction that takes into account the speed of rotation. By setting the correction factor to be small in keeping with the elapsed time from startup of the gas compressor 200, the torque at startup of the gas compressor 200 having a characteristic that the difference from the steady torque becomes smaller as the elapsed time from startup is longer can be set with accuracy in accordance with the elapsed time from startup. In the exemplification in FIG. 3, in the above embodiment, the correction factor is set in the range of 2 seconds in the elapsed time from startup. Therefore, the torque estimating device 100 performs correction in the range of 2 seconds from startup. However, 2 seconds as a period of performing the correction is merely an exemplification. In the torque estimating device of the present invention, the period of performing correction is not limited to 2 seconds from startup.

Figure 5:
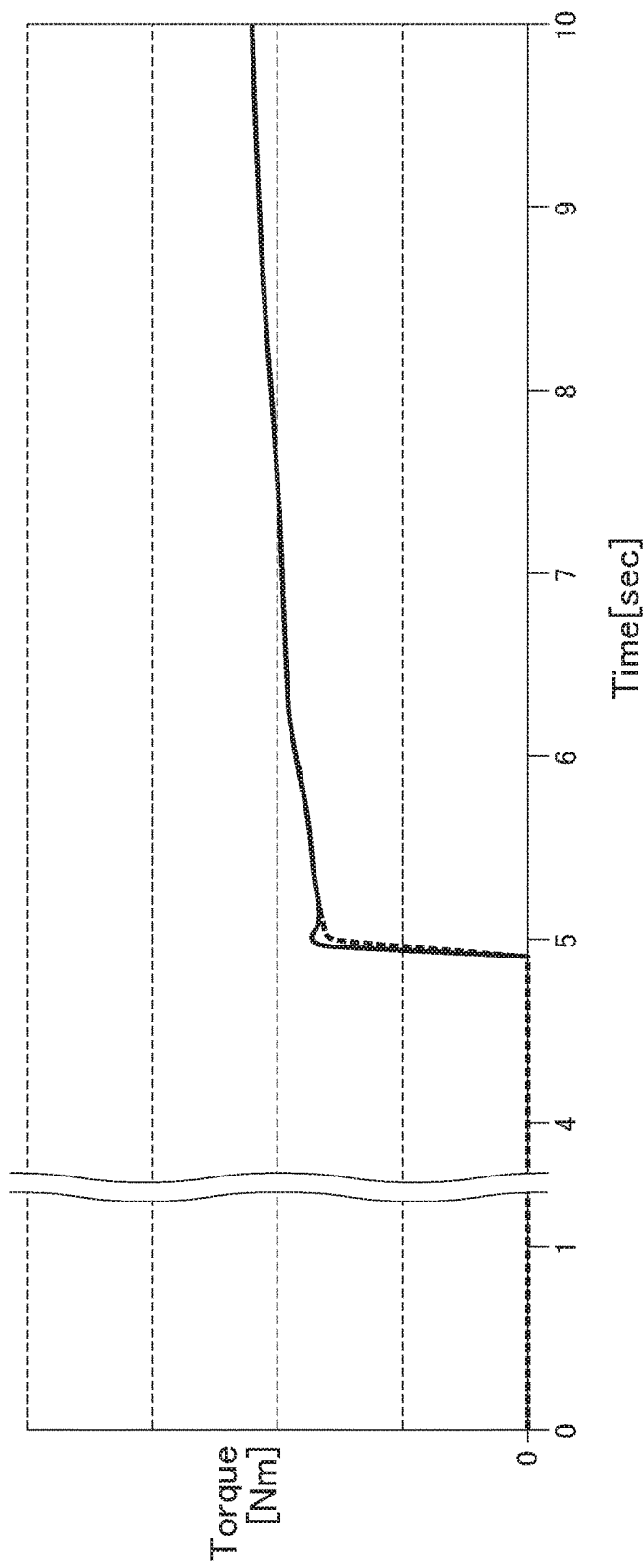
FIG. 5 is a graph showing one example of a torque set by the torque setting unit in a relatively low speed of rotation.

FIG. 5 is a graph showing one example of the torque set by the torque setting unit in a relatively low speed of rotation (for example, speed of rotation of less than 1000 (rpm)). In FIG. 5, the broken line (torque set by the torque setting unit 10) in the graph overlaps the solid line (torque actually detected) at 5.1 seconds in time and thereafter. FIGS. 2 and 4 show the torque when the speed of rotation of the gas compressor is a relatively high speed of rotation (for example, speed of rotation of 1000 (rpm) or greater). In a lower speed of rotation (for example, speed of rotation of less than 1000 (rpm)), as shown in FIG. 5, the difference between the torque (represented by the solid line) at startup and the torque (represented by the broken line) set by the torque setting unit 10 is not large. Thus, when the gas compressor 200 is operating in a relatively low speed of rotation (for example, speed of rotation of less than 1000 (rpm)), the torque estimating device 100 may not correct the torque set by the torque setting unit 10 or correction may be performed by the torque correcting unit 30 with the correction factor as 1.0.

In the torque estimating device 100 of this embodiment, the reference torque characteristic storage unit 20 stores the reference torque characteristic as a map. However, in the torque estimating device according to the present invention, the reference torque characteristic is not limited to being stored as a map and may be stored in a functional form or the like. The torque estimating device 100 of this embodiment stores the reference torque characteristic and the correction factor separately. However, in the torque estimating device according to the present invention, the reference torque characteristic may be stored in the form of a map or the like as a corrected torque characteristic (torque characteristic obtained by multiplying the reference torque characteristic by the correction factor) that takes into account the correction factor.

In the torque estimating device 100 of this embodiment, the torque correcting unit 30 corrects the torque set by the torque setting unit 10, in accordance with the speed of rotation of the gas compressor 200 and the elapsed time from startup of the gas compressor 200. However, instead of this form, the torque correcting unit 30 may correct the torque set by the torque setting unit 10, in accordance with the speed of rotation of the gas compressor 200, or may correct the torque set by the torque setting unit 10, in accordance with the elapsed time from startup of the gas compressor 200.

Specifically, in the case where the torque correcting unit 30 corrects the torque set by the torque setting unit 10, in accordance with the speed of rotation of the gas compressor 200, it suffices that the degree of correction be set to be larger as the speed of rotation of the gas compressor 200 is higher (the number of rotations is larger). In the case where the torque correcting unit 30 corrects the torque set by the torque setting unit 10, in accordance with the elapsed time from startup of the gas compressor 200, it suffices that the degree of correction be set to be smaller as the elapsed time from startup of the gas compressor 200 is longer. In this manner, an effect similar to this embodiment can be obtained, also with the torque estimating device 100 in which the torque correcting unit 30 performs correction in accordance with the speed of rotation of the gas compressor 200 or the elapsed time from startup of the gas compressor 200.

The gas compressor to which the torque estimating device according to the present invention is applied is not limited to the gas compressor 200 of the rotary vane type. A compressor of a swash plate type, a scroll type, or the like is also acceptable, and the types are not limited as such.

The invention claimed is:

1. A torque estimating device of a gas compressor, comprising:
 a reference torque characteristic storage unit configured to store a reference torque characteristic of a gas compressor as a torque characteristic of the gas compressor in a specific operation state;
 a torque setting unit configured to set a torque corresponding to an input speed of rotation of the gas compressor and pressure of a refrigerant discharged from the gas compressor, on the basis of the reference torque characteristic stored in the reference torque characteristic storage unit; and
 a torque correcting unit configured to set a torque at startup of the gas compressor among the torques set by the torque setting unit, by correcting the torque set by the torque setting unit, in accordance with the speed of rotation.

2. A torque estimating device of a gas compressor, comprising:
 a reference torque characteristic storage unit configured to store a reference torque characteristic of a gas compressor as a torque characteristic of the gas compressor in a specific operation state;
 a torque setting unit configured to set a torque corresponding to an input speed of rotation of the gas compressor and pressure of a refrigerant discharged from the gas compressor, on the basis of the reference torque characteristic stored in the reference torque characteristic storage unit; and
 a torque correcting unit configured to set a torque at startup of the gas compressor among the torques set by the torque setting unit, by correcting the torque set by the torque setting unit, in accordance with an elapsed time from startup.

3. A torque estimating device of a gas compressor, comprising:
 a reference torque characteristic storage unit configured to store a reference torque characteristic of a gas compressor as a torque characteristic of the gas compressor in a specific operation state;
 a torque setting unit configured to set a torque corresponding to an input speed of rotation of the gas compressor and pressure of a refrigerant discharged from the gas compressor, on the basis of the reference torque characteristic stored in the reference torque characteristic storage unit; and
 a torque correcting unit configured to set a torque at startup of the gas compressor among the torques set by the torque setting unit, by correcting the torque set by the torque setting unit, in accordance with the speed of rotation and an elapsed time from startup.

4. The torque estimating device of a gas compressor according to claim 3, wherein the torque correcting unit performs the correction of the torque set by the torque setting unit such that a degree of correction is set to be larger as the speed of rotation is higher and to be smaller as the elapsed time becomes longer.

5. The torque estimating device of a gas compressor according to claim 4, wherein the torque correcting unit performs the correction of the torque set by the torque setting unit such that a degree of correction is constant when the elapsed time has exceeded a length set in advance.

6. The torque estimating device of a gas compressor according to claim 1, wherein the torque correcting unit includes a correction factor storage unit that stores the correction factor for correcting the torque set by the torque setting unit, and the torque correcting unit sets the torque at startup by multiplying the torque set by the torque setting unit by the correction factor stored in the correction factor storage unit.

7. The torque estimating device of a gas compressor according to claim 2, wherein the torque correcting unit includes a correction factor storage unit that stores a correction factor for correcting the torque set by the torque setting unit, and the torque correcting unit sets the torque at startup by multiplying the torque set by the torque setting unit by the correction factor stored in the correction factor storage unit.

8. The torque estimating device of a gas compressor according to claim 3, wherein the torque correcting unit includes a correction factor storage unit that stores a correction factor for correcting the torque set by the torque setting unit, and the torque correcting unit sets the torque at startup by multiplying the torque set by the torque setting unit by the correction factor stored in the correction factor storage unit.

9. The torque estimating device of a gas compressor according to claim 4, wherein the torque correcting unit includes a correction factor storage unit that stores a correction factor for correcting the torque set by the torque setting unit, and the torque correcting unit sets the torque at startup by multiplying the torque set by the torque setting unit by the correction factor stored in the correction factor storage unit.

10. The torque estimating device of a gas compressor according to claim 5, wherein the torque correcting unit includes a correction factor storage unit that stores a correction factor for correcting the torque set by the torque setting unit, and the torque correcting unit sets the torque at startup by multiplying the torque set by the torque setting unit by the correction factor stored in the correction factor storage unit.

* * * * *